Figure 1:
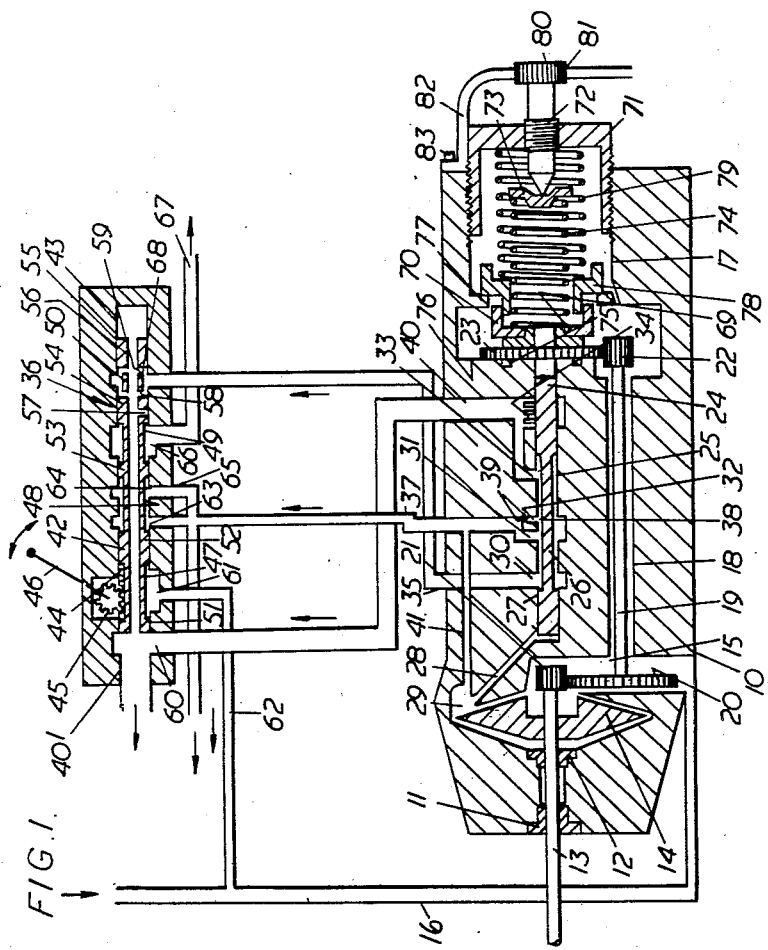

Oct. 6, 1964 C. L. JOHNSON 3,151,658
GAS TURBINE ENGINE FUEL SYSTEM
Filed July 11, 1960 2 Sheets-Sheet 1

Inventor
Christopher Linley Johnson
By Fred E. Shoemaker
and
Fred L. Witherspoon, Jr. Attorneys Oct. 6, 1964 C. L. JOHNSON 3,151,658
GAS TURBINE ENGINE FUEL SYSTEM
Filed July 11, 1960 2 Sheets-Sheet 2

Inventor
Christopher Linley Johnson
By Fred E. Shoemaker
and
Fred L. Witherspoon, Jr. Attorneys 3,151,658
GAS TURBINE ENGINE FUEL SYSTEM
Christopher Linley Johnson, Derby, England, assignor to Rolls-Royce Limited, Derby, England, a company of Great Britain
Filed July 11, 1960, Ser. No. 42,117
Claims priority, application Great Britain, July 20, 1959, 24,905/59
11 Claims. (Cl. 158—36.4)

This invention concerns a gas turbine engine fuel system and, although it is not so restricted, the invention is more particularly concerned with a gas turbine engine fuel system for use on a vertical lift engine.

According to the present invention there is provided a gas turbine engine fuel system comprising a valve body having a series of ports therein, a valve member adapted to open and close said ports on relative movement between said valve member and said valve body, said ports communicating with passages through which fuel may be delivered to burners of the engine, and means for positioning the valve member and valve body relatively to each other in accordance with engine rotational speed, the construction being such that, as engine rotational speed rises, the valve member first moves relatively to the valve body so as to open and close individual ports and thereby vary the fuel supply to the burners in a predetermined manner and then, when a predetermined speed is reached, the valve member acts as a top speed governor by reducing said fuel supply.

Preferably a throttle valve is provided downstream of said valve member and valve body, said throttle valve controlling flow through at least some of said passages.

One of said passages preferably by-passes said throttle valve, the arrangement being such that at idling speed the port communicating with the by-pass passage is open to permit fuel to flow through the by-pass passage to the burners.

The passages controlled by the throttle valve may comprise a main burner passage and a pilot burner passage, the ports in the valve body communicating with the by-pass passage, the pilot burner passage, and the main burner passage being arranged successively of each other in the direction in which the valve member moves on increased engine rotational speed.

Preferably the means for effecting relative movement of the valve body and valve member comprises a fuel pump which is adapted to be driven by the engine so that the pressure of the fuel from the delivery side thereof is a function of engine rotational speed.

Thus the valve member may be movable in a bore in the valve body, one end of the valve member being subjected to the pressure on the delivery side of the pump and the other end of the valve member being subjected to the pressure on the suction side of the pump.

Preferably the fuel system comprises resilient means adapted to act on the said other end of the valve member, and means for adjusting the pre-load on said resilient means.

The resilient means may comprise two springs one of which acts permanently on the said other end of the valve member and the other of which is spaced from the said other end until the engine rotational speed has reached a predetermined value.

Preferably the by-pass passage is adapted to communicate with an axial passage through the valve member of the throttle valve.

Means responsive to the compressor inlet pressure $P_1$ (or to some functionally related pressure) may be provided for varying the maximum effective throttle opening with variation of the value of $P_1$.

Figure 2:
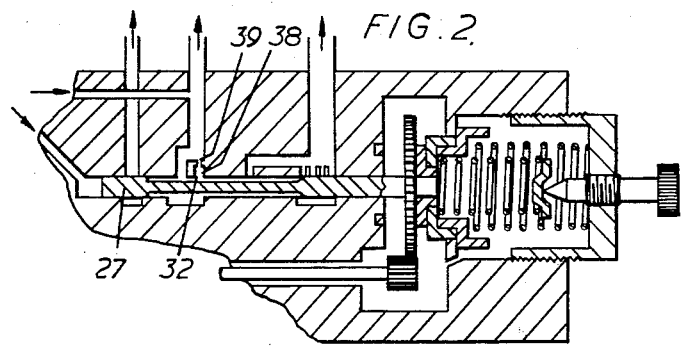
Figure 3:
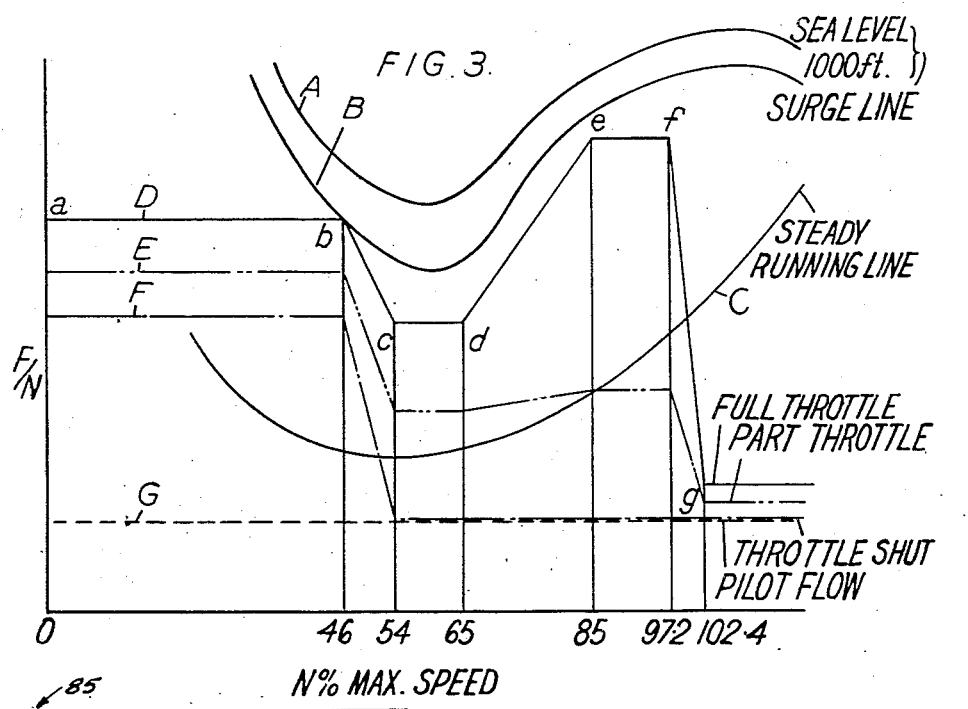
Figure 4:
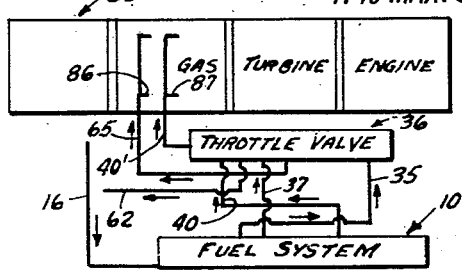

The invention is illustrated, merely by way of example, in the accompanying drawings, in which:

FIGURE 1 is a part-sectional diagrammatic representation of a gas turbine engine fuel system according to the present invention showing the parts thereof in one position, FIGURE 2 is a part-sectional view showing a portion of the fuel system illustrated in FIGURE 1 but with the parts in a different position, FIGURE 3 is a graph illustrating the operation of the fuel system of FIGURES 1 and 2, and FIGURE 4 is a diagrammatic side view of a gas turbine engine provided with the fuel system of FIGURES 1 and 2.

The terms "left" and "right" as used in the description below refer to left and right as viewed in the drawings.

Referring to the drawings, a gas turbine engine fuel system comprises a housing 10 having carbon bearings 11, 12 within which is journalled an engine driven pump shaft 13. The shaft 13 carries the impeller of a centrifugal pump 14.

The housing 10 is formed with a chamber 15 which is open to the suction, or low pressure, side of the pump 14, the chamber 15 being adapted to be supplied with fuel from a pipe 16. The housing 10 is also formed with a chamber 17 which communicates with the chamber 15 by way of a passage 18. Low pressure fuel is thus supplied to the chamber 17.

Rotatably mounted within the passage 18 is a countershaft 19. The left hand end of the countershaft 19 extends into the chamber 15 where it is provided with a gear 20, the gear 20 meshing with a pinion 21 on the pump shaft 13. The right hand end of the countershaft 19 extends into the chamber 17 and is provided with a pinion 22 which meshes with a gear 23 carried by a rotatably mounted valve member 24.

The valve member 24 is mounted for axial sliding movement in a bore 25 in the housing 10, the constant rotation of the valve member 24 in bore 25 helping to ensure that valve member 24 will not stick therein during such axial sliding movement. The bore 25 is shown as being co-axial with the pump shaft 13 although this is not essential. The valve member 24 has a centrally disposed reduced diameter portion 26 and, at its left hand end, a land 27. At its left hand end, the bore 25 communicates via a passage 28 with a chamber 29 at the delivery, or high pressure, side of the pump 14.

The bore 25 is provided with spaced ports 30, 31, 32, 33 and with a group of closely adjacent ports 34. The port 30 communicates with a by-pass passage 35 leading to a throttle valve 36. The port 31 communicates with and is supplied with high pressure fuel from the chamber 29 through a pipe 41 which is also connected to a pilot burner passage 37, the passage 37 leading to the throttle valve 36. The port 32 leads to a chamber 38 which communicates with the pipe 41 by way of a restriction 39, and it will be seen that fuel flow through the passage 37 is independent of the valve 24.

The ports 33, 34 communicate with a main burner passage 40, which leads via the throttle valve 36 to a main burner passage 40'.

The throttle valve 36 comprises a valve member 42 which is slidably mounted in a bore 43. The valve member 42 is formed with a rack 44 meshing with a pinion 45, the pinion 45 being rotatable by a pilot's lever 46.

The valve member 42 has spaced, reduced diameter portions 47–50 leaving lands 51–55. The valve member 42 also has a passage 56 extending axially therethrough and there are radial passages 57, 58, 59 communicating with the axial passage 56.

The bore 43 has a port 60 communicating with the main burner passage 40, a port 61 communicating with a return passage 62 leading to the fuel inlet pipe 16, a port 63 communicating with the pilot burner passage 37, a port 64 communicating with a pilot burner passage 65, a port 66 communicating with a dump passage 67, and a port 68 communicating with the by-pass passage 35.

At its right hand end, the valve member 24 is disposed within the chamber 17 where it is provided with a plate 69 having a circumferential flange 70. Threaded into the right hand end of the housing 10 is a cup-shaped member 71, an idling speed adjusting screw 72 being threaded axially through the cup-shaped member 71. The idling speed adjusting screw 72 bears on a spring plate 73, an idling governor spring 74 being interposed between the plates 69, 73.

The valve member 24 is movable between the FIGURE 1 position, in which the gear 23 abuts an annular bearing member 75 in an end wall 76 of the chamber 17, and a number of positions (one of which is shown in FIGURE 2) in which the high pressure fuel applied to the left hand end of the valve member 24 moves the valve member 24 to the right against the combined action of the spring 74 and of the low pressure fuel applied to the right hand end of the valve member 24.

The housing 10 is provided with an internal flange 77, a spring plate 78 being urged against the flange 77 by a main governor spring 79. The main governor spring 79 is mounted concentrically about the idling governor spring 74 and reacts against the cup-shaped member 71.

The head 80 of the adjusting screw 72 is provided with serrations 81 and is mounted in a serrated hole in a bridge piece 82 which is secured to the housing 10 by bolts 83. Adjustment of the load on the main governor spring 79 adjusts the maximum governed speed while adjustment of the load on the idling governor spring 74 adjusts the idling speed. It will be seen, therefore, that since the head 80 is normally locked in position in the hole in the bridge piece 82, adjustment of maximum governed speed (which is effected by screwing the cup-shaped member 71 into or out of the housing 10) can be effected without adjusting the load on the spring 74 provided the screw threads on the member 71 have the same pitch and hand. If, however, the bridge piece 82 is removed, rotation of the cup-shaped member 71 or of the adjusting screw 72 will adjust the load on both the springs 74, 79 and hence will adjust both maximum governed speed and idling speed.

FIGURE 1 illustrates the position of the valve member 24 at idling speed. In the FIGURE 1 position, the fuel pressure developed by the pump 14, and applied via the passage 28 to the left hand end of the valve member 24, will be insufficient to move the valve member 24 against the action of the spring 74. The land 27 will therefore confine fuel from the passage 28 to the left hand end of the bore 25.

Fuel passing through the pipe 41, however, will reach the pilot burner passage 37 and some of this fuel will pass via the ports 63, 64 and reduced diameter portion 48 to the pilot burner passage 65.

The remainder of the fuel from the passage 41 will pass via the ports 31, 32 to the central portion of the bore 25 so as to surround the reduced diameter portion 26. This fuel will then flow in part to the port 33 and so via the main burner passage 40 to the main burner passage 40' and in part to the port 30 and so via the by-pass passage 35, ports 58, 59, and axial passage 56 to the main burner passage 40'.

FIGURE 2 illustrates the position of the valve member 24 at about 60% maximum engine speed. In the FIGURE 2 position, the fuel pressure developed by the pump 14 and applied via the passage 28 to the left hand end of the valve member 24 has moved the valve member 24 towards the right so that the flange 70 contacts the spring plate 78 which will be held fixed at a light pre-load by the spring 79.

In this position, the land 27 will close off the by-pass passage 35. Fuel from the pipe 41, however, in addition to being supplied to the pilot burner passage 65, will be supplied via the port 33 to the main burner passage 40 and so to the main burner passage 40'.

The fuel flow described in the preceding paragraph will occur throughout a range of engine speeds from about 54–65% of maximum engine speed, although the flange 70 will not contact the spring plate 78 until about 60% maximum engine speed. Throughout the said range of engine speeds, the fuel flow will be proportional to the speed since the pressure developed by the pump 14 is proportional to the square of engine speed and the position of the valve member 24 will depend on the speed of the pump 14.

At engine speeds upwards of about 65% maximum engine speed, the fuel pressure developed by the pump 14 will be sufficient to move the valve member 24 against the action of the springs 74, 79. As the valve member 24 is so moved, the reduced diameter portion 26 will uncover the first of the ports 34 until at about 85% maximum engine speed all the ports 34 will be uncovered and the valve member 24 will be in what may be regarded as its fully open position. Preferably the length of the land 27 is such that movement of the valve 24 to the right will not uncover the port 30. Fuel from the pipe 41 will flow in part to the pilot burner passage 65 and in part, via the ports 33, 34 to the main burner passage 40 and so to the main burner passage 40'. The fuel flow to the engine will therefore be greater that that provided in the FIGURE 2 position.

Finally, as governed speed is approached, the land 27 will cover the port 31 with the result that only a very small quantity of fuel will be able to enter the central portion of the bore 25 via the port 32 through the restriction 39. Only this small quantity of fuel will therefore reach the main burner passage 40'. In this position, therefore, the valve member 24 acts as a top speed governor.

The port 32 and restrictor 39 ensure that fuel always flows to the main burner passage 40 so as to prevent the flame from going out in the event of excess rightward travel of the valve member 24. Normally, however, this would not be necessary since the pilot burners will be supplied with fuel through the passages 37, 65.

The valve member 24 will control the acceleration of the engine safely up to top speed at sea level. However for jet lift purposes it is necessary to control the thrust of the engine and it is for this purpose that the throttle valve 36 is provided.

The throttle valve 36 has, for convenience, been assumed in the above description to be in the fully open position shown in FIGURE 1. The valve member 42 of the throttle valve 36, however, is progressively movable between the FIGURE 1 position and a fully closed position (not shown).

In the course of leftward movement of the throttle valve member 42 towards the closed position, the land 51 will first cover the port 60 so as to cut off communication between the passage 40, 40'. This is the partially closed position in which the valve member 42 is placed when it is desired to maintain the engine at idling speed; in this position the pilot and by-pass flows are unimpeded.

Further leftward movement of the throttle valve member 42 starts to close first the port 68, which controls flow through the by-pass passage 35, and then the port 64, which controls flow through the pilot burner passage 65. The arrangement is such that the by-pass port 68 is fully closed when the pilot burner port 64 is half closed. In this position however, the land 51 will not wholly cover the port 60 and fuel from the main burner passage 40 will therefore flow via the port 60, reduced diameter portion 47 and port 61 to the return passage 62. At the same time, the reduced diameter portion 49 will permit communication between the pilot burner passage 65 and the dump passage 67. The port 57 in the valve member 42 will also communicate with the dump passage 67, whereby fuel from the by-pass passage 35 and axial passage 56 may flow to the dump passage 67.

Until the fully closed position is reached, by-pass flow through the axial passage 56 will not be affected by movement of the valve member 42.

A given position of the throttle valve member 42 will produce substantially a given thrust over the range of engine speeds (namely, at least 85% of top speed) which are employed when the engine is used to lift an aircraft. This is because, as pointed out above, the valve member 24 is in its fully open position at 85% top speed and since the delivery pressure of the pump 14 will be proportional to the square of engine speed, a given position of the throttle valve member 42 will therefore maintain the ratio fuel consumption/speed at a given value. At a constant intake pressure, e.g. at sea level with varying intake temperature, however, a constant value of the fuel consumption/speed ratio results in a constant thrust at steady running conditions. The engine construction may, moreover, be such that at any given temperature the specific fuel consumption increases substantially at a rate proportional to engine speed and, if this is so, although engine speed will increase with increased altitude the specific fuel consumption will increase correspondingly so as to maintain substantially constant the fuel consumption/speed ratio and hence the thrust.

FIGURE 4 shows diagrammatically a gas turbine engine 85 provided with the fuel system of FIGURES 1 and 2, pilot burners being shown diagrammatically at 86 and main burners being shown diagrammatically at 87.

The operation of the fuel system is illustrated in the graph constituting FIGURE 3, wherein the ordinate represents $F/N$, i.e. fuel consumption/engine speed. The abscissa of the graph represents engine speed ($N$) as a percentage of maximum speed. The percentages of maximum speed shown for the various points on FIGURE 3 are merely by way of illustration.

The curves A and B in FIGURE 3 are surge lines at sea level and at 1000 ft. respectively of the compressor of an engine for which the fuel system of FIGURES 1 and 2 is designed. That is to say the curves A and B indicate where surging of the said compressor will occur. The curve C is the engine steady running line i.e. the line indicating the fuel consumption/engine speed relationship at which steady running will occur of the said engine.

Curves D, E, and F illustrate the fuel flow/engine speed relationship corresponding to the throttle valve 36 being fully open, partly open, and fully shut respectively. The line G relates to flow through the pilot burner passage 65.

The portion $a$–$b$ of curve D, which relates to speeds from 0–46% maximum engine speed, shows the fuel flow/speed relationship obtained when the valve member 24 is in the FIGURE 1 position i.e. before the delivery pressure of the pump 14 rises sufficiently to overcome the spring 74. It will be seen that throughout the portion $a$–$b$, increased speed is associated with a constant ratio of fuel flow to speed.

The portion $b$–$c$ of curve D, which relates to speeds of from 46–54% maximum engine speed, shows the fuel flow/speed relationship obtained when the pump pressure is moving the valve member 24 to a position in which the land 27 reduces flow through the by-pass passage 35 and in which all the ports 34 are still covered. Increasing speed will therefore be associated with reduced fuel flow per engine revolution throughout the portion $b$–$c$, such reduction, as will be seen from FIGURE 3, preventing surging of the compressor.

The portion $c$–$d$ of curve D, which relates to speeds of 54–65% maximum engine speed, shows the fuel flow/speed relationship obtained when the valve member 24 has moved to the position shown in FIGURE 2 of the drawings. Throughout the portion $c$–$d$ the ratio of fuel flow to speed remains constant.

The portion $d$–$e$ of curve D, which relates to speeds from 65–85% maximum engine speed, shows the fuel flow/speed relationship obtained as the valve member 24 uncovers increasing numbers of the ports 34. Throughout the portion $d$–$e$, fuel flow increases rapidly with increasing engine speed.

The portion $e$–$f$ of curve D, which relates to speeds from 85–97.2% maximum engine speed, shows the fuel flow/speed relationship when all the ports 34 are open. As will be seen, the fuel flow/speed remains constant throughout the portion $e$–$f$. If the fuel flow were allowed to increase during the portion $e$–$f$ in the same way as in the portion $d$–$e$, surging of the compressor would result.

Finally, the portion $f$–$g$ of the curve D, which relates to speeds above 97.2% maximum engine speed, illustrates the fuel flow/speed relationship corresponding to the position in which the land 27 covers the port 31. The portion $f$–$g$ thus illustrates the manner in which the valve member 24 in this position acts as a top speed governor.

It will be seen from the curve E that when the throttle valve 36 is partly shut a smaller fuel flow is obtained but the fuel flow/speed characteristic is nevertheless similar to that obtained with the throttle valve fully open.

The line E cuts the engine steady running line C at a point which is equivalent of point $e$ on line D but which has a lower value by reason of the throttle valve 36 being partly shut. Consequently the ratio of fuel flow/speed over that portion of the line E which is equivalent to the portion $e$–$f$ of line D remains constant.

If the steady running line C moves because of variations in intake temperature or pressure the engine speed will vary, but the thrust will remain constant.

The curve F shows that, when the throttle valve 36 is completely shut, the by-pass passage 35 will still act to supply fuel to the main burners whereby the fuel system will provide an idling governor setting of the engine.

Acceleration time may be adjusted by adjusting the setting of a maximum throttle opening stop (not shown).

I claim:

1. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, fuel inlet means through which fuel is supplied to the valve body, a valve member for controlling flow between the fuel inlet means and said ports, said valve member having obturating and fuel flow portions which are alignable with said ports for respectively preventing and permitting fuel flow therethrough, and means for effecting relative movement in a given direction between said valve member and valve body solely on increase in engine rotational speed, relative movement in the said given direction aligning the fuel flow portion of the valve member with increasing numbers of said ports and in its farthermost position in said direction aligning an obturating portion of the valve member with one of said ports when a predetermined engine speed is reached so as to reduce the total amount of fuel supplied to the combustion equipment.

2. In a gas turbine engine having combustion equipment, a fuel system for controlling the total amount of fuel supplied to the combuston equipment, said fuel system comprising a valve body having a series of ports therein, a series of passages which communicate with said ports and through which fuel may be delivered to the pilot and main burners of the engine, fuel inlet means through which fuel is supplied to the valve body, a valve member for controlling flow between the fuel inlet means and said ports, said valve member having obturating and fuel flow portions which are alignable with said ports for respectively preventing and permitting fuel flow therethrough, a manually operable throttle valve arranged downstream of said valve member and valve body and being constructed to control flow through at least some of said passages, and means for effecting relative movement in a given direction between said valve member and valve body solely on increase in engine rotational speed, relative movement in the said given direction aligning the fuel flow portion of the valve member with increasing numbers of said ports and in its farthermost position in said direction aligning the obturating portion of the valve member with one of said ports when a predetermined engine speed is reached so as to reduce the total amount of fuel supplied to the combustion equipment.

3. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, fuel inlet means through which fuel is supplied to the valve body, a valve member for controlling flow between the fuel inlet means and said ports, said valve member having obturating and fuel flow portions which are alignable with said ports for respectively preventing and permitting fuel flow therethrough, a fuel pump driven by the engine so that the pressure of the fuel from the delivery side of the pump is a function of engine rotational speed, and means responsive to said fuel pressure on the delivery side of the pump arranged to effect relative movement in a given direction between said valve member and valve body solely on increase in engine rotational speed, relative movement in the said given direction aligning the fuel flow portion of the valve member with increasing numbers of said ports and in its farthermost position in said direction aligning the obturating portion of the valve member with one of said ports when a predetermined engine speed is reached so as to reduce the total amount of fuel supplied to the combustion equipment.

4. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, fuel inlet means through which fuel is supplied to the valve body, a valve member for controlling flow between the fuel inlet means and said ports, said valve member having obturating and fuel flow portions which are alignable with said ports for respectively preventing and permitting fuel flow therethrough, a pump for said fuel driven by the engine so that the pressure of the fuel from the delivery side of the pump is a function of engine rotational speed, means subjecting one end of the valve member to the pressure on the delivery side of the pump and means subjecting the other end of the valve member to the pressure on the suction side of the pump, whereby the valve member is moved in a given direction relatively to the valve body on increase in engine rotational speed, relative movement in the said given direction aligning the fuel flow portion of the valve member with increasing numbers of said ports and finally aligning the obturating portion of the valve member with one of said ports when a predetermined engine speed is reached so as to reduce the total amount of fuel supplied to the combustion equipment.

5. The gas turbine engine of claim 4 in which a spring is arranged to resist movement of said valve member in said given direction.

6. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, fuel inlet means through which fuel is supplied to the valve body, a valve member for controlling flow between the fuel inlet means and said ports, said valve member having obturating and fuel flow portions which are alignable with said ports for respectively preventing and permitting fuel flow therethrough, a pump for said fuel driven by the engine so that the pressure of the fuel from the delivery side of the pump is a function of engine rotational speed, means subjecting one end of the valve member to the pressure on the delivery side of the pump and means subjecting the other end of the valve member to the pressure on the suction side of the pump, whereby the valve member is moved in a given direction relatively to the valve body on increase in engine rotational speed, resilient means acting against the other end of the valve member, and means for adjusting the pre-load on the said resilient means, relative movement in the said given direction aligning the fuel flow portion of the valve member with increasing numbers of said ports and finally aligning the obturating portion of the valve member with one of said ports when a predetermined engine speed is reached so as to reduce the total amount of fuel supplied to the combustion equipment.

7. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, fuel inlet means through which fuel is supplied to the valve body through at least one of said ports, a slidable valve member for controlling flow between the fuel inlet means and said ports, said valve member having obturating and fuel flow portions which are selectively alignable with said ports for respectively preventing and permitting fuel flow therethrough, a pump for said fuel driven by the engine so that the pressure of the fuel from the delivery side of the pump is a function of engine rotational speed, means subjecting one end of the valve member to the pressure on the delivery side of the pump and means subjecting the other end of the valve member to the pressure on the suction side of the pump, whereby the valve member is moved in a given direction relatively to the valve body on increase in engine rotational speed, and two springs one of which acts continuously on the said other end of the valve member and the second of which is spaced from said other end until the engine rotational speed has reached a predetermined value, relative movement in the said given direction aligning the fuel flow portion of the valve member with increasing numbers of said ports and finally aligning the obturating portion of the valve member at least partially with said one of said ports when the said predetermined engine speed is reached so as to reduce the total amount of fuel supplied to the combustion equipment.

8. In a gas turbine engine having combustion equipment, a fuel system for controlling the total amount of fuel supplied to the combustion equipment, said fuel system comprising a valve body having a series of ports therein, a series of passages which communicate with said ports and through which fuel may be delivered to said combustion equipment, a fuel inlet means through which fuel is supplied to the valve body through at least one of said ports, a slidable valve member for controlling flow between the fuel inlet means and said ports, said valve member having obturating and fuel flow portions which are selectively alignable with said ports for respectively preventing and permitting fuel flow therethrough, a pump for said fuel driven by the engine so that the pressure of the fuel from the delivery side of the pump is a function of engine rotational speed, means subjecting one end of the valve member to the pressure on the delivery side of the pump and means subjecting the other end of the valve member to the pressure on the suction side of the pump, whereby the valve member is moved in a given direction relatively to the valve body on increase in engine rotational speed, and two springs one of which acts continuously on the said other end of the valve member and the second of which is spaced from said other end until the engine rotational speed has reached a predetermined value, relative movement in the said given direction first aligning an obturating portion with a port to reduce the total amount of fuel supplied to the combustion equipment, aligning the fuel flow portion of the valve member with increasing numbers of said ports and finally aligning another obturating portion of the valve member at least partially with said one of said ports when the said predetermined engine speed is reached so as to reduce the total amount of fuel supplied to the combustion equipment.

9. A gas turbine engine fuel system as claimed in claim 2 in which one of said passages is a by-pass passage, flow through which is always permitted by said throttle valve except when fully closed, the port communicating with the by-pass passage being aligned with the said fuel flow portion of the valve member at idling speed of the engine.

10. A gas turbine engine fuel system as claimed in claim 9 in which the passages controlled by the throttle valve comprise a main burner passage and a pilot burner passage, the ports in the valve body communicating with the by-pass passage, the pilot burner passage, and the main burner passage being arranged successively of each other in the said given direction.

11. A gas turbine engine as claimed in claim 9 in which the throttle valve has a movable member having an axial passage therethrough and in which the by-pass passage is adapted to communicate with said axial passage through the valve member of the throttle valve to deliver a limited supply of fuel to the main burner of the engine.

References Cited in the file of this patent
UNITED STATES PATENTS

| | | |
|---|---|---|
| 2,440,566 | Armstrong | Apr. 27, 1948 |
| 2,605,709 | Jubb | Aug. 5, 1952 |
| 2,639,584 | Schorn | May 26, 1953 |
| 2,674,847 | Davies et al. | Apr. 13, 1954 |
| 2,691,268 | Prentiss | Oct. 12, 1954 |
| 2,761,495 | Greenland | Sept. 4, 1956 |
| 2,770,945 | Crim | Nov. 20, 1956 |
| 2,963,082 | Binford et al. | Dec. 6, 1960 |